United States Patent
Despreaux et al.

(10) Patent No.: US 6,447,572 B2
(45) Date of Patent: Sep. 10, 2002

(54) METHOD OF REGULATING A FLUID TREATMENT PLANT, FLUID TREATMENT PLANT AND APPLICATION OF SUCH A PLANT TO THE PRODUCTION OF A CONSTITUENT OF AIR

(75) Inventors: Frédéric Despreaux, Paris (FR); Nathalie Derive-Teuscher, Paris (FR); Christian Monereau, Paris (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/777,908

(22) Filed: Feb. 7, 2001

(30) Foreign Application Priority Data

Feb. 7, 2000 (FR) .............................. 00 01479

(51) Int. Cl.$^7$ ................................. B01D 53/047
(52) U.S. Cl. .............. 95/1; 95/96; 95/101; 95/130; 95/139; 95/140; 96/109; 96/130; 96/143
(58) Field of Search ............. 95/1, 96–98, 100–106, 95/130, 139, 140; 96/109, 128, 130, 143, 144

(56) References Cited

U.S. PATENT DOCUMENTS

| | | | | |
|---|---|---|---|---|
| 5,198,763 A | * | 3/1993 | Konishi ............. | 324/207.23 |
| 5,679,134 A | * | 10/1997 | Brugerolle et al. ......... | 95/96 |
| 5,696,444 A | * | 12/1997 | Kipp et al. ............. | 324/207.32 |
| 5,746,806 A | * | 5/1998 | Aylsworth et al. ........ | 96/130 X |
| 5,785,740 A | * | 7/1998 | Brugerolle et al. ......... | 95/102 |
| 5,912,426 A | * | 6/1999 | Smolarek et al. ........ | 96/130 X |
| 5,968,236 A | * | 10/1999 | Bassine .............. | 96/130 |
| 6,056,804 A | * | 5/2000 | Keefer et al. ............ | 95/96 |
| 6,099,618 A | * | 8/2000 | Monereau ............. | 95/101 |
| 6,143,056 A | * | 11/2000 | Smolarek et al. .......... | 95/96 |
| 6,171,371 B1 | * | 1/2001 | Derive et al. ........... | 96/130 X |
| 6,238,458 B1 | * | 5/2001 | Monereau ............. | 95/101 X |
| 6,245,127 B1 | * | 6/2001 | Kane et al. ............. | 95/101 |
| 6,344,069 B2 | * | 2/2002 | Smolarek et al. ........ | 95/102 X |

FOREIGN PATENT DOCUMENTS

| | | |
|---|---|---|
| EP | 0 743 087 | 11/1996 |
| GB | 1195368 | 6/1970 |
| WO | WO 98/35134 | 8/1998 |

\* cited by examiner

*Primary Examiner*—Robert H. Spitzer
(74) *Attorney, Agent, or Firm*—Young & Thompson

(57) ABSTRACT

A compression machine (compressor 4 and/or pump 5) of the plant (1) for the treatment of a fluid, typically by pressure swing adsorption, comprises at least one detector (7) for detecting clearance between a moving part (6) and a stator and delivering a measurement signal used so as to vary, depending on this measurement, the operation of the plant and especially to automatically shorten the phases during which the machine is running at an excessively high speed.

17 Claims, 1 Drawing Sheet

METHOD OF REGULATING A FLUID TREATMENT PLANT, FLUID TREATMENT PLANT AND APPLICATION OF SUCH A PLANT TO THE PRODUCTION OF A CONSTITUENT OF AIR

FIELD OF THE INVENTION

The present invention relates to the field of fluid treatment plants, more particularly of the pressure swing adsorption type, comprising at least one compression machine for making fluids flow in the plant.

BACKGROUND OF THE INVENTION

Compression machines, which create a pressure differential between an intake port and a delivery port and can therefore be used as a compressor for taking the fluid to a higher pressure or as a pump for sucking in the fluid and depressurizing an upstream circuit, are generally designed according to the desired inlet/outlet pressure difference or pressure ratio in normal operating conditions, the latter being manifested by a certain number of operational parameters for the compression machine, in particular the temperature of the moving parts. The clearances of the latter with respect to the stator and to the bearings take into account the expansion of these various components resulting from the temperature rise between the machine at rest and the machine in normal operation.

For low overpressures, typically of the order of 1 bar for operation as a compressor and of the order of 0.5 bar for operation as a vacuum pump, most compression machines, and especially rotating machines having profiled rotors, may operate without cooling, the expansion remaining moderate.

For higher overpressures and for extended operating periods, compression machines must be cooled by injecting cold gas or water into the fluid circuit.

Although providing enhanced performance and safety, cooled compression machines turn out to be particularly expensive, especially because of the ancillary equipment necessary.

Consequently, cooling proves to be necessary only for prolonged use with high compression ratios and it is possible to obviate the need for cooling by controlling and limiting the time for which the machine is operating at full speed according to pre-established charts, as described for example in the operating manual for Roots—Hibon—Series SC superchargers, March 1993, sold by the company Hibon International.

However, controlling and running such a compression machine only according to the duration of operating phases at full speed is tricky to implement in plants varying in speed depending on the demand, with short treatment cycles, in which the compression and/or pumping phases are extremely short, or else in plants operating with a reversible compression machine, such as that described in document EP-A-0 743 087 in the name of the Applicant.

SUMMARY OF THE INVENTION

The subject of the present invention is a method of intermittently operating and of controlling a fluid compression machine coupled to a fluid treatment plant, typically of the pressure swing adsorption type, of simple and effective design, offering, including for uncooled machines, great operating flexibility and enhanced safety.

To do this, according to one characteristic of the invention, while the compression machine is operating, at least one clearance between two parts in relative motion of the latter is measured and the operation of the plant is varied according to this measurement.

According to more particular characteristics, a clearance measurement signal is generated, this signal is compared with a predetermined threshold and the operation of the plant is varied when the signal temporarily exceeds the threshold. In particular, for plants of the pressure swing adsorption type, all or part of the adsorption of the desorption cycle is varied.

Clearance measurements in compression machines, especially rotating machines, are well known in the art, as described for example in documents U.S. Pat. Nos. 5,198,763 and 5,696,444.

However, the aim of the known clearance measurements is essentially to monitor the change in clearances which change slowly and permanently, particularly as the parts in relative motion wear out, in order to eventually emit an alarm and/or stop the machine and not to operate a continuous process for regulating the operation of the gas treatment plant according to the present invention.

The subject of the invention is also a fluid treatment plant comprising at least one fluid compression machine, more particularly of the type not cooled by an external fluid, comprising at least one moving part in a stator in order to inject a fluid into at least one region of the plant and/or to extract a fluid therefrom, in which the compression machine comprises at least one detector which detects clearance between one region of the moving part and the stator and delivers a signal, and a control device which varies the operation of the plant in response to the signal.

Finally, the subject of the present invention is the application of such a plant to the production of a constituent of air, typically by retention of the other constituents of air on one or more adsorbent beds.

BRIEF DESCRIPTION OF THE DRAWINGS

Further features and advantages of the invention will become apparent in the following description of embodiments given by way of illustration but implying no limitation, given with reference to the appended drawings in which.

DETAILED DESCRIPTION OF THE INVENTION

Figure 1:
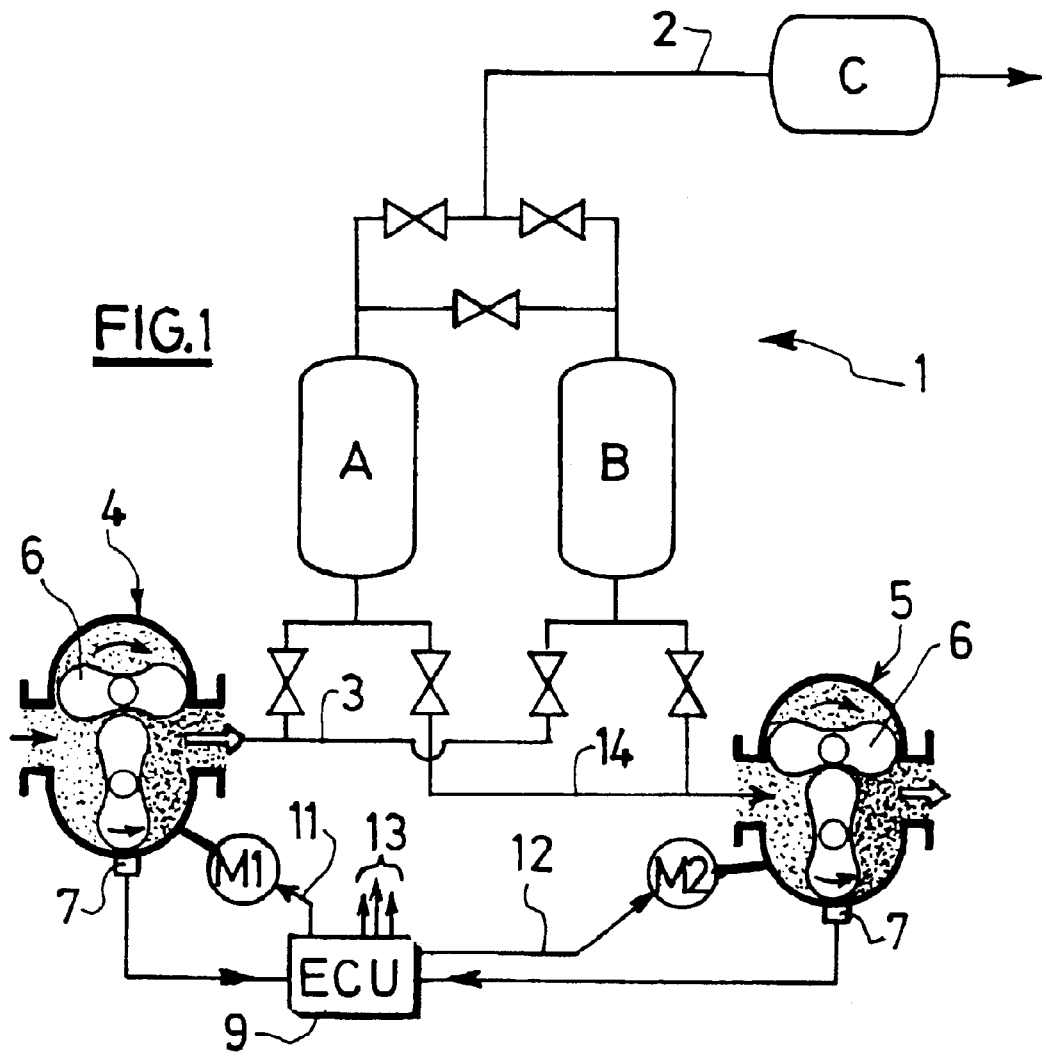
FIG. 1 shows schematically an example of a plant for treating a fluid by pressure swing adsorption according to the invention.

FIG. 1 shows the general arrangement of a plant 1 for treating a fluid by pressure swing adsorption with pressures on either side of the atmospheric pressure, called VPSA (Vacuum Pressure Swing Adsorption).

In the example shown, the plant comprises two adsorbers A, B, each filled with at least one adsorbent bed, the outlets of which are connected to a production line 2 including a buffer tank C and the inlets of which are selectively connectable, via a second set of valves, to an intake line 3 receiving a gas mixture to be separated, the gas mixture being compressed by a compressor 4, and to a discharge line 14 incorporating a discharge pump 5.

Advantageously, the compressor 4, like the pump 5, is a rotating machine with multilobate rotors 6 of the so-called Roots type, with no external coolant, as described in the abovementioned Roots-Hibon documentation, which is most particularly suitable for this type of VPSA plant for the production of oxygen from atmospheric air, in which the overpressure demanded of the compressor 4 does not exceed 1.3 bar and the vacuum demanded of the pump 5 remains less than 0.6 bar. The compressor 4 and the pump 5 are driven by electric motors M1 and M2, respectively.

Figure 2:
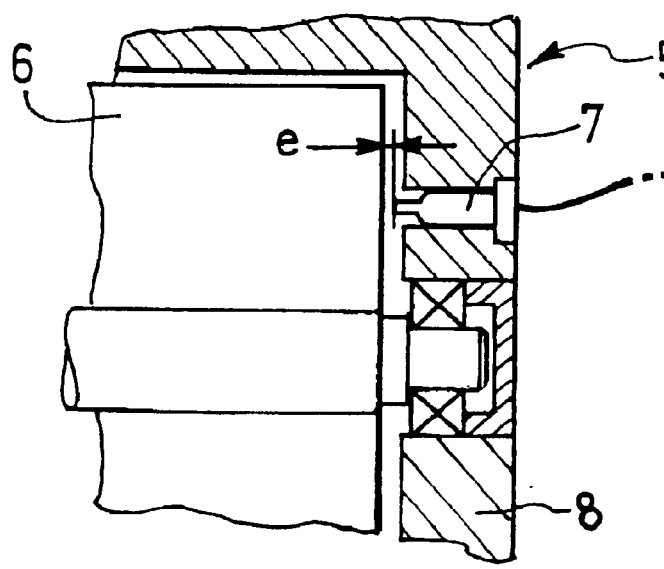
FIG. 2 is a partial view, in cross section, of one embodiment of a rotating compression machine according to the invention.

According to the invention, as shown in greater detail in FIG. 2, at least one proximity detector 7 is mounted in the casing 8 of the pump 5 or of the compressor 4 near one end, for example an axial end in the example shown in FIG. 2, of one of the rotors 6 in order to deliver to a central control unit 9 a signal representative of the clearance e between the reference plane of the detector 7 and the end face of the rotor and thus to determine the effects of the expansion in the rotating machine depending on its speed and the operating time at the various speeds.

The signal emitted by a sensor 7 is compared in the central control unit 9, in a comparator stage, with at least one pre-established reference value, determined experimentally according to the nominal cycle of the plant 1 and the speed variations imposed in situ by the user. When the threshold represented by this reference value is exceeded, the unit 9 delivers signals 11, 12 to the compressor 4 and/or to the pump 5 in order to temporarily reduce their speed of rotation and/or to anticipate one of their rest phases and/or to anticipate the machine passing to a less stringent step, until the signal goes back below the threshold value, thus temporarily "forcing" the nominal cycle settings of the plant recorded in the unit 9.

Advantageously and concomitantly, in order to take into account the additional dead times imposed on the rotating machines 4 and 5, the unit 9 will also deliver signals 13 to the various inlet and outlet valves in order to anticipate their being opened/closed so as to keep the production gas parameters in the line 2 approximately constant.

For a machine such as an abovementioned Roots—Series C machine, with an output of less than 180 m$^3$/hour and a rotor 6 diameter of less than 0.3 meters, it is possible to fit, in the end plate 8 of the machine on the opposite side from the drive shaft for the rotors, a magnetic-effect proximity detector 7, such as those sold by Metrix Instrument Co., with a control distance e, corresponding to a nominal operation of the machine, of approximately 1.25 mm for a VPSA cycle of duration less than 60 seconds, that is to say with compression and suction phases not exceeding 25 seconds, in order to produce oxygen with a purity of greater than 89% on at least one bed of zeolite-based adsorbent.

Although the invention has been described with respect to particular embodiments, it is not in any way limited thereby but is capable of modifications and variants which will occur to a person skilled in the art within the framework of the claims hereinafter. In particular, the process and the plant can be applied in other types of gas treatment, for example for the separation of carbon monoxide or carbon dioxide from synthesis gas by adsorption.

The invention can also be applied to cooled machines which are forced, unpredictably, to operate temporarily at an excessively high speed.

What is claimed is:

1. Method of regulating a fluid treatment plant including at least one fluid compression machine, which comprises:
    measuring, while said compression machine is in operation, at least one clearance between two components in relative motion of the machine; and
    varying the operation of the fluid treatment plant according to this measurement.

2. The method according to claim 1, wherein a clearance measurement signal is generated, said signal being compared to at least one predetermined threshold, and the operation of the plant is varied when the signal temporarily exceeds said predetermined threshold.

3. The method according to claim 2, wherein the operating time of the compression machine is reduced, when the signal exceeds the predetermined threshold.

4. The method according to claim 2, wherein the speed of the compression machine is reduced, when the signal exceeds the predetermined threshold.

5. The method according to claim 1, wherein the plant is a plant for treating a fluid by adsorption on an adsorbent and by a pressure swing.

6. The method according to claim 5, wherein the compression machine is a pump for desorbing the adsorbent.

7. The method according to claim 5, wherein the duration of at least one of a compression and a pumping phase of the plant is shortened, when the signal exceeds the predetermined threshold.

8. The method according to claim 5, wherein when the signal exceeds the predetermined threshold, dead times are introduced into or extended in the cycle of the plant and/or the transition of the machine to a less stringent cycle step is anticipated.

9. The method according to claim 5, for separating the constituents of air.

10. The method according to claim 5, for the production of carbon monoxide or carbon dioxide from a gas mixture containing these compounds.

11. A fluid treatment plant comprising at least one fluid compression machine having at least one moving part in a stator in order to inject a stream of fluid into at least one region of the plant and/or to extract a stream of fluid therefrom, the compression machine comprising at least one detector which detects clearance between one region of the moving part and the stator and delivers a signal, and a control device which varies the operation of the plant in response to said signal.

12. The plant according to claim 11, wherein the control device includes a stage for comparing the signal to at least one predetermined threshold.

13. The plant according to claim 11, wherein the plant is a plant for the treatment of a fluid by pressure swing adsorption, which includes at least one mass of adsorbent.

14. The plant according to claim 13, wherein the compression machine is a machine with multilobate rotors.

15. The plant according to claim 13, wherein the adsorbent is a zeolite.

16. The plant according to claim 13, wherein the pressure swing adsorption separates at least one constituent of air.

17. The plant according to claim 11, wherein the moving part is a rotor.

* * * * *